US011610508B2

(12) United States Patent
Hegemann

(10) Patent No.: US 11,610,508 B2
(45) Date of Patent: Mar. 21, 2023

(54) APPARATUS FOR ASSISTING THE MOBILITY OF VISUALLY IMPAIRED PEOPLE IN ROAD TRAFFIC

(71) Applicant: RTB GmbH & Co. KG, Bad Lippspringe (DE)

(72) Inventor: Andreas Hegemann, Werne (DE)

(73) Assignee: RTB GmbH & Co. KG

( * ) Notice: Subject to any disclaimer, the term of this patent is extended or adjusted under 35 U.S.C. 154(b) by 444 days.

(21) Appl. No.: 16/650,661

(22) PCT Filed: Feb. 1, 2018

(86) PCT No.: PCT/EP2018/052502
§ 371 (c)(1),
(2) Date: Jun. 8, 2020

(87) PCT Pub. No.: WO2019/063132
PCT Pub. Date: Apr. 4, 2019

(65) Prior Publication Data
US 2020/0294420 A1 Sep. 17, 2020

(30) Foreign Application Priority Data

Sep. 30, 2017 (DE) ..................... 10 2017 009 187.0

(51) Int. Cl.
*G09B 21/00* (2006.01)
*G01S 19/51* (2010.01)
(52) U.S. Cl.
CPC ............ *G09B 21/006* (2013.01); *G01S 19/51* (2013.01)
(58) Field of Classification Search
CPC ....... H04W 48/04; H04W 4/80; H04W 4/024; H04W 4/023; H04W 4/02; G09B 21/006; G01S 19/51; G01S 19/14; G01S 5/02
See application file for complete search history.

(56) References Cited

U.S. PATENT DOCUMENTS 5,689,259 A 11/1997 Norris
2011/0140924 A1* 6/2011 Sennett ................. G08G 1/07
340/944
(Continued)

FOREIGN PATENT DOCUMENTS

DE 19714156 C1 2/1998
EP 3156765 A1 4/2017
(Continued)

OTHER PUBLICATIONS

Friedrich, Bernhard; Technische Universität Braunschweig; ITS Niedersachsen GmbH, InMoBS-Team Innerstädtische Mobilitätsunterstützung für Blinde und Sehbehinderte InMoBS: Abschlussbericht. Mar. 17, 2015. DOI: 10.2314/GBV:856477168. URL: https://www.tib.eu/de/suchen/download/?tx_tibsearch_search[docid]=TIBKAT%3A856477168.
(Continued)

*Primary Examiner* — Dung Hong
(74) *Attorney, Agent, or Firm* — McGarry Bair PC

(57) ABSTRACT

The apparatus comprises a wireless communication device which is to be carried by the person and has a GPS receiver, a blind guiding device with an acoustic source, a position memory, a second GPS receiver and a comparator for comparison of the position data of the GPS receivers. The communication device continuously sends attention information and, upon receipt of the attention information, the blind guiding device switches on pedestrian orientation signals, an optical release signal and acoustic release signals and/or changes their volume.

13 Claims, 1 Drawing Sheet

(56) References Cited

U.S. PATENT DOCUMENTS

| | | | | |
|---|---|---|---|---|
| 2015/0330787 A1* | 11/2015 | Cioffi | ................ | G01C 21/3641 |
| | | | | 701/538 |
| 2016/0171883 A1* | 6/2016 | Kvetny | ................ | G09B 21/001 |
| | | | | 340/944 |
| 2018/0296427 A1* | 10/2018 | Troesch | ................ | G09B 21/003 |

FOREIGN PATENT DOCUMENTS

| KR | 20070075623 A | * | 7/2007 |
|---|---|---|---|
| KR | 20070112910 A | * | 11/2007 |

OTHER PUBLICATIONS

James M. Coughlan and Huiying Shen. "Crosswatch: A System for Providing Guidance to Visually Impaired Travelers at Traffic Intersections," Journal of Assistive Technologies; Apr. 1, 2013; 7(2): doi:10.1108/17549451311328808.

* cited by examiner

APPARATUS FOR ASSISTING THE MOBILITY OF VISUALLY IMPAIRED PEOPLE IN ROAD TRAFFIC

CROSS-REFERENCE TO RELATED APPLICATIONS

This application is a National Phase application of International Application No. PCT/EP2018/052502, filed Feb. 1, 2018, which claims the benefit of German Application 10 2017 009 1897.0, filed on Sep. 30, 2017, both of which are incorporated herein in their entireties.

TECHNICAL FIELD

The invention relates to an apparatus for assisting the mobility of visually impaired people in road traffic. It starts from DE 197 14 156 C1.

BACKGROUND

At pedestrian crossings with traffic lights, acoustic signaling devices emit orientation signals and release signals. Orientation signals enable a visually impaired person to find the traffic light post. Release signals are output during the pedestrian green time and signal to the visually impaired person that he/she may cross the street. Regarding the desired volume level of the acoustic signals, there is often a conflict of objectives: residents want a volume level of the acoustic signals that is as low as possible while visually impaired people prefer a higher volume level.

From DE 197 14 156 C1, an information system for people in public space, in particular blind people or visually impaired people is known, with an information beacon and a transportable user device. The latter continuously sends a request signal. Upon receipt of the request signal, the information beacon sends a message which is received by the user device and is converted into an attention signal.

In a publication of the kowoma GPS forum of Feb. 13, 2008 having the title "GPS-Anforderungen" [engl.: GPS requirements] (http://www.kowoma.de/GPS/Fehlerquellen.htm), the error sources of the GPS that result in an inaccuracy in the position determination with GPS are described.

BRIEF DESCRIPTION

It is an object of the invention to propose an apparatus for assisting the mobility of visually impaired people in road traffic, which enables an automatic request of the release signal and/or only raises the volume of the acoustic signals when a visually impaired person is in the vicinity of the pedestrian traffic light.

The apparatus-related part of the object is solved by the features of claim 1, and the method-related part is solved by the features of claims 5 and 6.

The invention relates to an apparatus for assisting the mobility of visually impaired people in road traffic and comprises a wireless communication device which is to be carried or is carried by the person and is equipped with a first data transmitter, a first data receiver and a GPS receiver, a blind guiding device which is equipped at least with an acoustic source, a position memory and/or a second GPS receiver, a second data receiver and a second data transmitter, a comparator which is designed to compare the position data of the GPS receiver with the position data of the second GPS receiver or the content of the position memory.

According to a first embodiment of the inventive method for the operation of the afore-mentioned apparatus, the communication device continuously sends an attention information. Upon receipt of the attention information, the blind guiding device switches on an optical release signal, sends pedestrian orientation signals and/or release signals and/or changes their volume.

According to a second embodiment of the inventive method for the operation of the afore-mentioned apparatus, the blind guiding device continuously sends a ready signal, and upon receipt of the ready signal the communication device sends an attention information, upon receipt of which the blind guiding device switches on an optical release signal, sends acoustic pedestrian orientation signals and/or acoustic release signals and/or changes their volume.

In the second embodiment, the personal rights of the visually impaired person are better protected since unauthorized people cannot constantly and at any place receive an information on the visually impaired person but at most when a communication between the visually impaired person's communication device and the blind guiding device takes place.

According to a preferred embodiment of the invention, its communication device is a mobile phone, in particular a smartphone. It makes use of the fact that these devices are very common in particular among visually impaired people and generally have a Bluetooth LE interface and a GPS receiver.

With a Bluetooth LE module (BLE) inserted in the blind guiding device, it can be determined whether there is a visually impaired person in the near surrounding. For this, the smartphone of the visually impaired person sends a defined identification via BLE. When this identification is received by the blind guiding device, it prepares itself to switch on an optical and acoustical pedestrian release signal, to switch on the pedestrian release signal when reaching a predeterminable distance to the blind guiding device or the traffic light post, or additionally to set the volume of its signals corresponding to the distance of the visually impaired person.

Up to now, a visually impaired person first has to search for and feel the traffic light post. Subsequently, he/she has to find and press the request button on the traffic light post. If, on the other hand, as suggested in a preferred embodiment of the invention, the path of the visually impaired person is tracked and his/her presence directly next to the pedestrian crossing is recognized, this is used for the automatic request of the release signal. Moreover, it is possible to continuously reduce the volume of the orientation signal with progressive approach.

According to an advantageous development of the inventive method, the position of the blind guiding device or the blind guiding devices is determined once and stored in their position memories.

According to an advantageous development of the invention, the current position of the communication device is continuously newly determined, compared with the content of the position memory and the direction of movement of the carrier of the communication device is determined from the respective difference.

As a result, it is possible in the case of road traffic installations, e.g. road intersections with several pedestrian crossings extending in different directions, which are each equipped with a blind guiding device, to only address that blind guiding device based on the direction of movement of the carrier of the communication device towards which the carrier of the communication device moves.

One problem is the inaccuracy of the position measurement. This is caused by the following influences (information has been taken from www.kowoma.de/GPS/Fehlerquellen. htm):

| | |
|---|---|
| disturbances caused by the ionosphere | ±5 m |
| variations of the satellite orbits | ±2.5 m |
| satellite clock errors | ±2 m |
| multipath effect | ±1 m |
| disturbances caused by the troposphere | ±0.5 m |
| calculation and rounding errors | ±1 m |

Usually, several blind guiding devices are provided at a road traffic installation. For determining the distances of the individual visually impaired people, each blind guiding device may be equipped with a GPS receiver. The relative position of the individual blind guiding devices to each other may however also be determined once with a portable GPS device and stored in the position memory. The position is then measured by only one or a few blind guiding devices and afterwards transmitted to all the others. All further blind guiding devices may then include the stored offset into the distance calculation and determine the distance of the visually impaired people.

In DGPS, the difference between a received GPS coordinate and the exactly measured coordinate of the receiver is formed. This difference is transmitted in the form of correction data to other receivers. The exact measurement of the receiver and the transmission of the correction data is however not required in the invention as proposed herein, but possible within the scope of the invention. As a result, the installation is considerably simplified. Only data relative to each other have to be processed. The absolute position does not have to be determined.

BRIEF DESCRIPTION OF THE DRAWINGS

Further features and advantages of the invention result from the following description which in connection with the enclosed drawings explains the invention on the basis of an embodiment.

DETAILED DESCRIPTION

Figure 1:
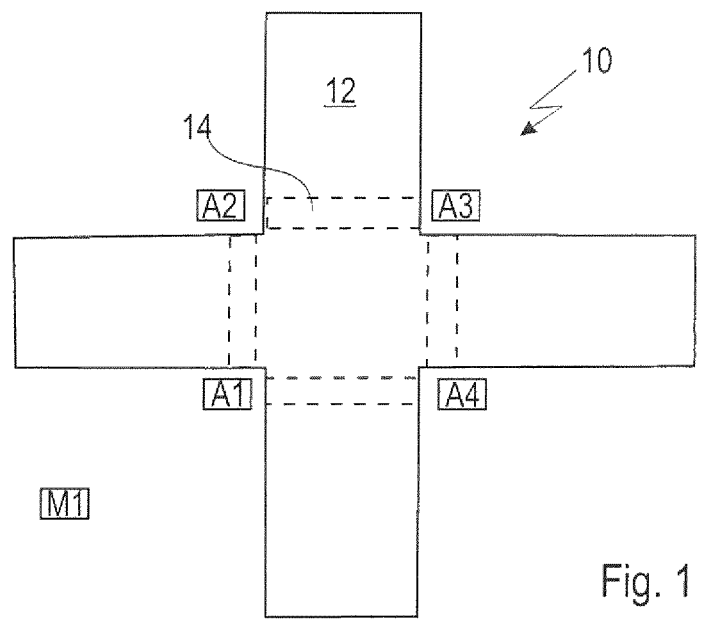
FIG. 1 shows a road intersection with pedestrian crossings secured with traffic lights.

In FIG. 1, an intersection 10 with lanes 12 and pedestrian crossings 14 is illustrated. At non-illustrated traffic light posts, there are, in addition to likewise not illustrated optical traffic lights and request buttons, blind guiding devices A1-A4 which are described in more detail on the basis of FIG. 2 and each have inter alia an acoustic source and a GNSS receiver. A visually impaired person with a GNSS receiver M1 is in the vicinity of the intersection 10 (GNSS=global navigation satellite system, e.g. GPS, Glonas, Beidou, Galileo).

Figure 2:
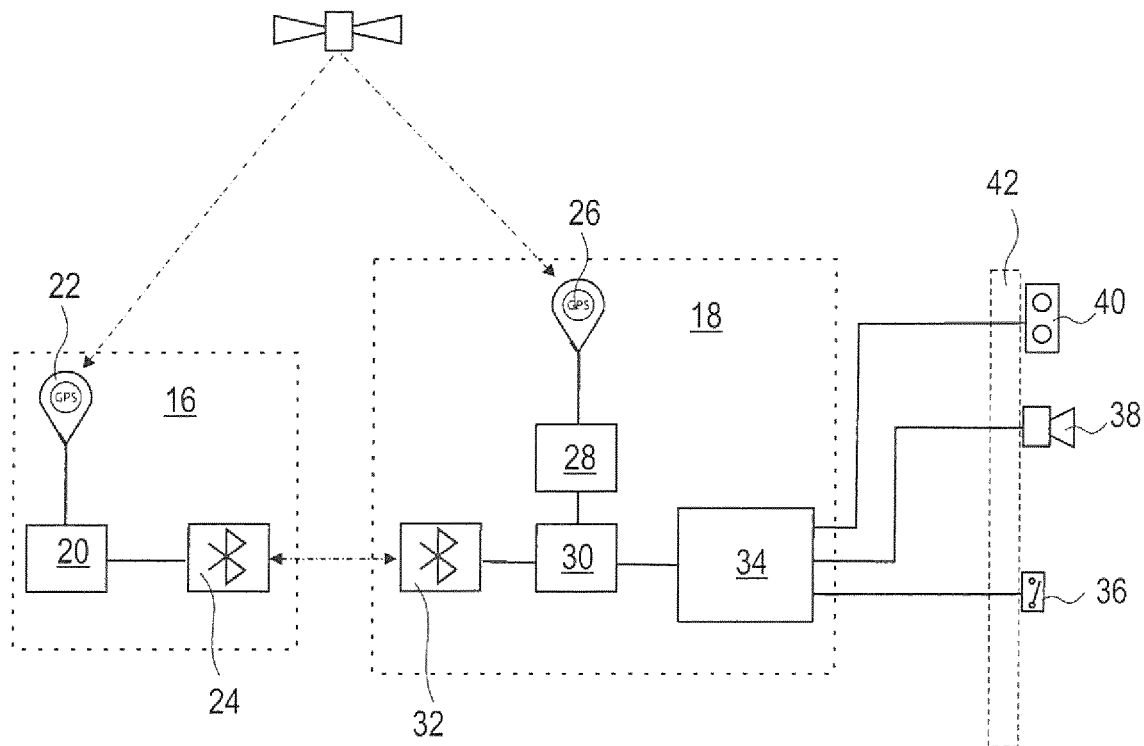
FIG. 2 shows a block diagram of an inventive apparatus.

FIG. 2 shows a block diagram of an inventive apparatus. Therein, a smartphone to be carried by a visually impaired person is identified with the reference sign 16 and a blind guiding device is identified with 18. The central unit 20 of the smartphone 16 that is known per se is equipped with a first GPS receiver 22 and a first Bluetooth interface 24. The blind guiding device 18 comprises a second GPS receiver 26, the received position data of which are stored in a position memory 28, a second Bluetooth interface 32, a comparator 30 and a traffic light control unit 34. To the latter, at least one request button 36, an acoustic source 38 and a pedestrian traffic light 40 are connected. The components 36, 38, 40 are mounted to a traffic light post 42.

The blind guiding device 18 continuously sends a ready signal via the second Bluetooth interface 32. As soon as the smartphone 16 receives this ready signal via its first Bluetooth interface 24, it sends an attention information which transmits the position data of the smartphone 16 via the Bluetooth connection 24, 32 to the comparator 30. When the comparator 30 has recognized a predeterminable minimum distance between the smartphone 16 and the blind guiding device 18, the blind guiding device 18 activates an optical and acoustic release signal. Already upon receipt of the first attention information, acoustic pedestrian orientation signals are emitted and their volume changed and after switching on the pedestrian release signals their volume is changed dependent on the distance between the smartphone 16 and the blind guiding device 18.

The position G measured via GNSS is determined as follows:

$$G = P + F1 + F2 + F3 + F4 + F5$$

Wherein
G: measured position
P: actual exact position
F1: error of the measurement receiver (calculation and rounding error, influence by satellite geometry)
F2: error caused by multipath propagation
F3: error caused by troposphere
F4: error caused by ionosphere
F5: satellite error (variations of the satellite orbits, clock errors of the satellites)

According to http://www.kowoma.de/gps/Fehlerquellen.htm there result the following values for the errors:

| | |
|---|---|
| disturbances caused by the ionosphere | ±5 m |
| variations of the satellite orbits | ±2.5 m |
| satellite clock errors | ±2 m |
| multipath effect | ±1 m |
| disturbances caused by the troposphere | ±0.5 m |
| calculation and rounding errors | ±1 m |
| From this, there results a total error of | ±12 m. |

The calculated distance D from the blind guiding device A1 to the visually impaired person M1 is then GA-GM. Since the distance of the two GNSS receivers is very little, the error caused by the troposphere and the ionosphere is assumed to be identical. Two cases are observed for the multipath propagation. The resulting error is the same for both receivers, which is to be assumed in the case of very little distances.

For the distance, then the two formulas result:
error in the case of identical multipath propagation:

$$D = (PA + F1A + F2 + F3 + F4 + F5) - (PM + F1M + F2 + F3 + F4 + F5)$$

$$D = (PA + F1A) + (F2 + F3 + F4 + F5) - (PM + F1M) - (F2 + F3 + F4 + F5)$$

$$D = (PA + F1A) - (PM + F1M) + (F2 + F3 + F4 + F5) - (F2 + F3 + F4 + F5)$$

$$D = (PA + F1A) - (PM + F1M)$$

error in the case of different multipath propagation $$D=(P4+F1A+F2A+F3+F4+F5)-(PM+F1M+F2M+F3+F4+F5)$$

$$D=(P4+F1A+F2A)+(F3+F4+F5)-(PM+F1M+F2M)-(F3+F4+F5)$$

$$D=(P4+F1A+F2A)-(PM+F1M+F2M)+(F3+F4+F5)-(F3+F4+F5)$$

$$D=(P4+F1A+F2A)-(PM+F1M+F2M)$$

In both cases, the highest sources of errors are eliminated. The error is approximately reduced by the factor 5 in the case of different multipath propagation. The closer the two GNSS get to each other, the more likely the receivers will be subjected to the same multipath propagation errors. In the case of immediately adjacent positions, also the multipath propagation errors are identical within the required accuracy. If also the error caused by the multipath propagation is eliminated, then the error is halved once more. Altogether, the error is reduced by approximately a power of ten by the inventive method.

After the GNSS receiver has received a position, the calculated position is transmitted via radio e.g. via Bluetooth LE to the counterpart. On both sides (blind guiding device Ax—visually impaired person M1), the difference between the own position and the position transmitted via radio is calculated. The difference is the distance between the blind guiding device Ax and the visually impaired person M1. This distance is evaluated by the blind guiding device 18.

The invention claimed is:

1. An apparatus for assisting the mobility of a visually impaired person in road traffic, comprising
   a wireless communication device which is to be carried or is carried by a visually impaired person and is equipped at least with a first data transmitter, a first data receiver and a GPS receiver,
   at least two blind guiding devices for a road traffic system with at least two pedestrian crossings each of which is equipped with a respective blind guiding device; each of respective blind guiding device being, is equipped at least with an acoustic source, a position memory a second data receiver and a second data transmitter, wherein at least one of the blind guiding devices is equipped with a second GPS receiver,
   a comparator which is designed to compare the position data of the GPS receiver of the wireless communication device with the position data of the second GPS receiver or the content of the position memory of the respective blind guiding device,
   wherein the once determined relative position of the individual blind guiding devices to each other is stored in their position memories as an offset and only one or more of the blind guiding devices is configured to measure the position of the communication device by comparison of the position data of the GPS receiver of the communication device with the position data of the GPS receiver of the respective blind guiding device and the transmit the position to all other blind guiding devices,
   wherein all other blind guiding devices are configured to include the stored offset into a distance calculation and to determine the distance of the wireless communication device of the visually impaired person.

2. The apparatus according to claim 1, the communication device thereof being a mobile phone, in particular a smartphone.

3. The apparatus according to claim 1, the blind guiding devices thereof and the communication device thereof each being equipped with a wireless near range communication interface, in particular a Bluetooth LE interface.

4. The apparatus according to claim 1, for a road traffic installation with several pedestrian crossings which are each equipped with a blind guiding device.

5. The method for the operation of the apparatus according to claim 1, for a road traffic installation with several pedestrian crossings which are each equipped with a blind guiding device, in which the relative position of the individual blind guiding devices to each other is determined once and stored in their position memories as an offset, and the position of the communication device is measured by only one or a few blind guiding devices and then transmitted to all others, whereupon all further blind guiding devices then include the stored offset into the distance calculation and determine the distance of the communication device of the visually impaired.

6. A method for the operation of the apparatus according to claim 5, in which the communication device continuously sends an attention information and upon receipt of the attention information the blind guiding device switches on an optical release signal, sends pedestrian orientation signals and/or acoustic release signals and/or changes their volume.

7. A method for the operation of the apparatus according to claim 5, in which the blind guiding device continuously sends a ready signal and upon receipt of the ready signal the communication device sends an attention information, upon receipt of which the blind guiding device switches on an optical release signal, sends acoustic pedestrian orientation signals and/or acoustic release signals and/or changes their volume.

8. The method according to claim 5, in which the relative position of the blind guiding devices to each other is determined once, in particular with a portable GPS device and stored in the position memories.

9. The method according to claim 5, for the operation of an apparatus with several blind guiding devices, in which the relative position of the individual blind guiding devices to each other is determined once, in particular with a portable GPS device and stored in their position memories.

10. The method according to claim 5, in which the current position of the communication device is transmitted to the blind guiding device or the blind guiding devices, is compared thereat to the content of the position memory, and the volume of the orientation signals and/or release signals is set dependent on the comparison result.

11. The method according to claim 10, in which after the carrier of the communication device stayed in the direct vicinity of the blind guiding device for a predetermined amount of time, the optical release signal is switched on and acoustic release signals are emitted.

12. The method according to claim 10, for a road traffic installation with several pedestrian crossings running in various directions, which are each equipped with a blind guiding device, in which dependent on the direction of movement of the carrier of the communication device one of the blind guiding devices to be controlled is addressed.

13. The method according to claim 5, in which the current position of the communication device is continuously newly determined and transmitted to the blind guiding device, is compared thereat to the content of the position memory and, from the respective difference, the direction of movement of the carrier of the communication device is determined.

\* \* \* \* \*